UNITED STATES PATENT OFFICE.

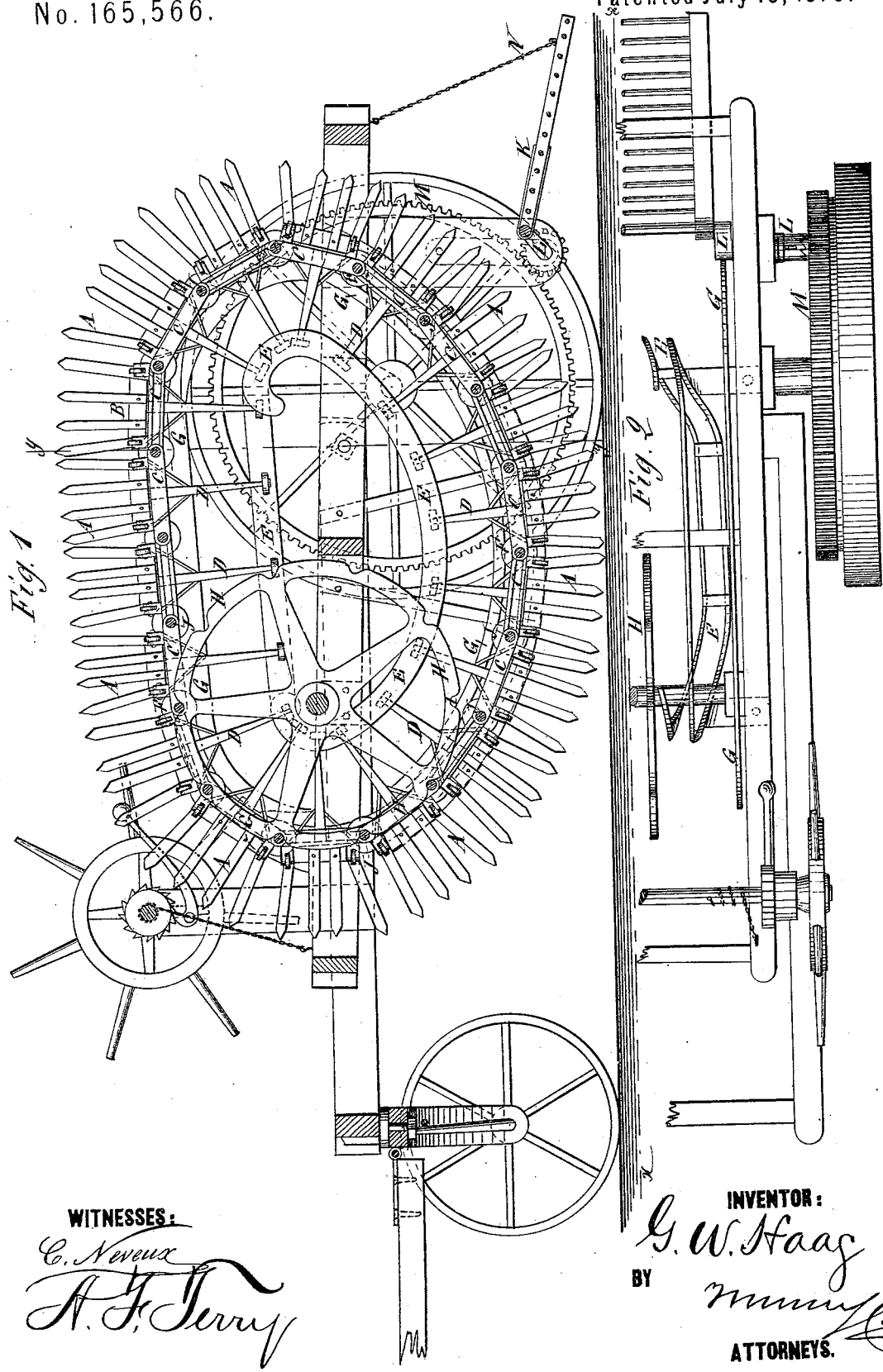

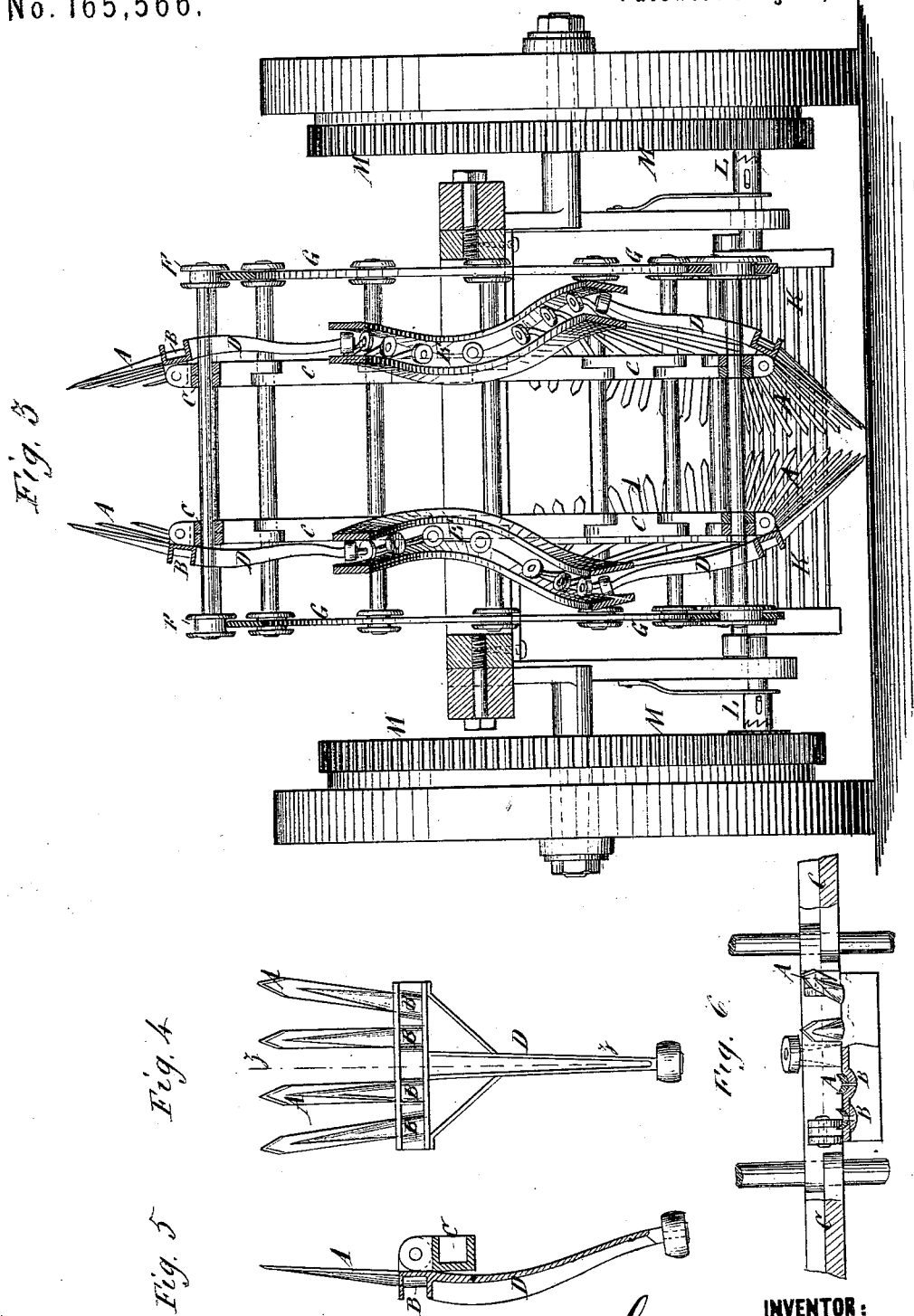

GEORGE W. HAAG, OF MILTON, PENNSYLVANIA, ASSIGNOR TO HIMSELF AND PEMBROKE CHURCHILL, OF SAME PLACE.

IMPROVEMENT IN POTATO-DIGGERS.

Specification forming part of Letters Patent No. 165,566, dated July 13, 1875; application filed May 8, 1875.

*To all whom it may concern:*

Be it known that I, GEORGE W. HAAG, of Milton, in the county of Northumberland and State of Pennsylvania, have invented a new and Improved Potato-Digger, of which the following is a specification:

The invention will first be fully described in connection with drawing, and then pointed out in the claims.

Figure 1 is a longitudinal sectional elevation of my improved machine. Fig. 2 is a top view of a portion of it. Fig. 3 is a transverse section on line $y\ y$ of Fig. 1. Fig. 4 is an elevation of a section of the chain of prongs. Fig. 5 is a section of Fig. 4 on line $z\ z$; and Fig. 6 is a detail of the chain and teeth, partly in horizontal section and partly in plane.

Similar letters of reference indicate corresponding parts.

A represents the prongs or teeth, which are to be pressed into the ground on each side of the row to dig up the potatoes. They are connected in groups of four, more or less, to blocks B, which are hinged to the links C of an endless chain, and to each block is attached an arm or lever, D, which runs in a camway, E, which opens and closes the teeth. These chains have grooved rollers, F, which run on the ways G to carry the teeth around; and in combination with the front portion of the ways there are wheels H, to aid in carrying the chains over that part of their path to lessen the friction, the wheels having notches I, in which the rods or axles J of the chains are carried. The fluted or grooved transverse section of these teeth is represented in Figs. 4, 5, and 6.

The shaking screen K, for separating the earth, is arranged immediately in the rear of the diggers, and at its front end is mounted on the crank-shaft L, and the rear end is suspended by the chains N. The crank-shaft is turned by the toothed rims M of the truck-wheels.

Having thus described my invention, I claim as new and desire to secure by Letters Patent—

1. The two sets of teeth A, to press into the ground and close under the roots by the forward movement of the machine, said teeth being mounted on endless chains, in combination with horizontally-elongated ways G for the chains, substantially as specified.

2. The teeth A, constructed in fluted or grooved transverse section, in combination with the endless chains and ways G, substantially as specified.

GEORGE W. HAAG.

Witnesses:
JOHN G. KURTZ,
JNO. MILLER.